UNITED STATES PATENT OFFICE.

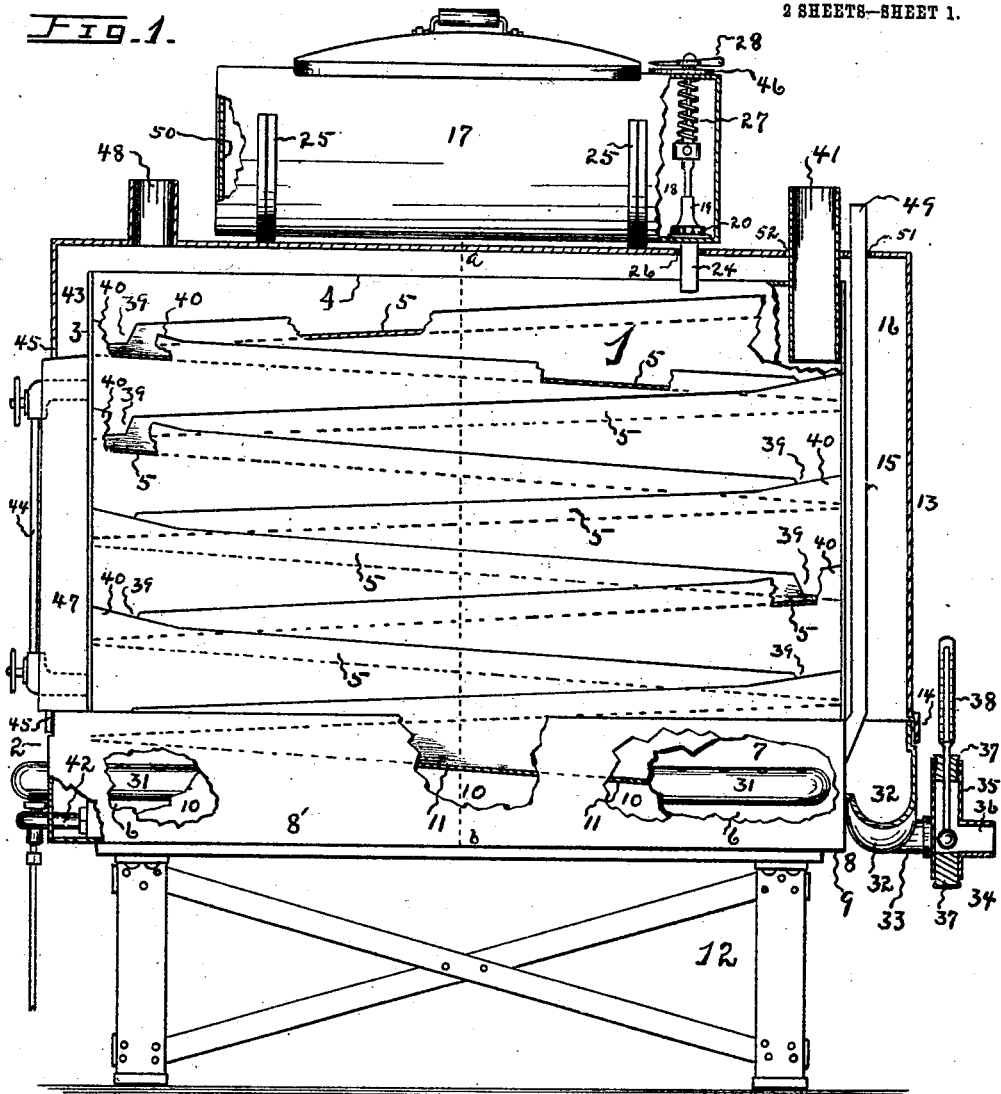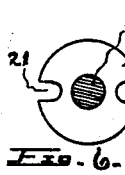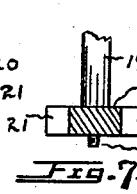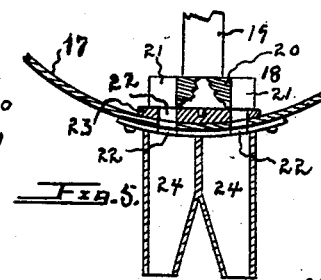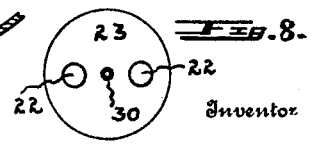

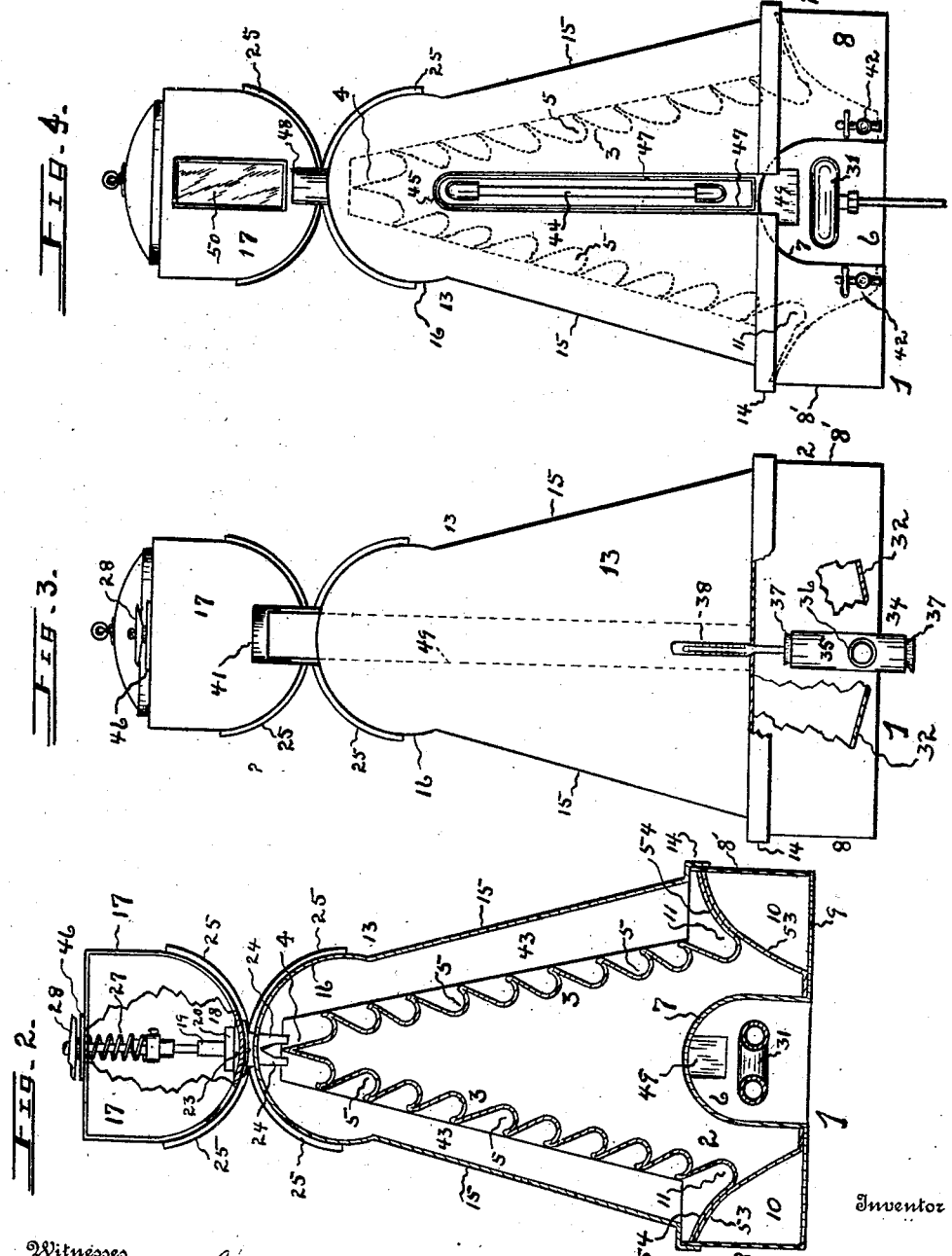

CHARLES E. HINMAN, OF COUNCIL BLUFFS, IOWA, ASSIGNOR TO NEBRASKA MILK PASTEURIZER COMPANY, OF OMAHA, NEBRASKA, A CORPORATION.

PASTEURIZING AND STERILIZING APPARATUS.

No. 904,615.  Specification of Letters Patent.  Patented Nov. 24, 1908.

Application filed August 3, 1908. Serial No. 446,617.

*To all whom it may concern:*

Be it known that I, CHARLES E. HINMAN, a citizen of the United States, residing at Council Bluffs, in the county of Pottawattamie and State of Iowa, have invented certain new and useful Improvements in Pasteurizing and Sterilizing Apparatus, of which the following is a specification.

This invention relates to improvements in sterilizing and pasteurizing apparatus for treatment of milk or other liquids, of the class operative by heating the milk or liquid while the latter passes upon inclined, heated ways, by gravity, without spraying, atomizing or agitation.

The principal object of the invention is to provide an apparatus for the purpose mentioned which will utilize as much of the heat as possible and will transmit the heat to the liquid uniformly. In devices of this class heretofore used the construction has been such that heating of the water has been attended with considerable delay and expense, only a small per cent. of the fuel being utilized.

Another objection to the operation of said devices has been that the milk in a part of the troughs or inclined passage ways becomes unduly heated, while an inadequate degree of heat is imparted to milk in other troughs.

In the present invention an improved form is employed for the water receptacle whereby practically no heat is lost from radiation, and whereby an equality of heat may be maintained and communicated to all of the passage ways, and by use of which water, comparatively speaking, may be readily heated.

The invention has reference to a novel formation and arrangement of inclined ways or heating troughs, to draft ways for the heating element, to ventilation of the heating chamber, indicating devices, adjustable devices for control of the milk flow, and to a construction whereby the parts may be conveniently dissembled for cleaning.

With these and other objects in view, the invention presents a novel construction and arrangement of parts as described herein, pointed out by the claims, and as illustrated by the drawing, wherein,—

Figure 1 is a side elevation of a pasteurizing and sterilizing apparatus, embodying my invention, the housing jacket being in longitudinal section, and parts of the milk container, inclined passage ways and connections, being partly broken away or in section, to clearly show the preferred construction. Fig. 2 is a transverse, sectional view through the middle of the water receptacle, its base, and housing jacket, being a view on line *a b* of Fig. 1, looking to the draft flue or front of the apparatus, a part of the milk container being broken away. Figs. 3 and 4 are views, respectively, of the front and rear ends of the apparatus, Fig. 3 being partly broken away to show a detail relating to the two inclined ways for movement of pasteurized milk; Fig. 4, by broken lines, illustrating relative position of inclined passage ways for milk, formed upon the two sides of the water receptacle. Fig. 5 is a detail relating to Figs. 1 or 2, showing a two-way valve for the milk container, to control the feed. Figs. 6, 7 and 8 are details relating to the construction of the valve shown in Fig. 5; Fig. 6 is a plan view of the bearing head with the spindle in section; Fig. 7 is a side view of the bearing head, partly in section, and Fig. 8 is a plan view of the bearing plate.

Referring now to the drawing for a more particular description, numeral 1 indicates a milk-heater or water-receptacle, having a base-portion 2, with side-walls 3, extended upwardly and generally convergent to the apex 4, the side walls being bent to form a series of longitudinally inclined passage ways 5. The convergence of the two sides 3 from the base, while presenting corrugations in cross-section, are uniform as compared with each other, and present an inclination from their base similar to two sides of a pyramid.

A longitudinal recess 6 is provided, opening upon the lower wall of the base to form a fire box, preferably having the arched ceiling or wall 7. An angular supporting base 8 is provided, disposed exteriorly of base 2 of the heater, having side walls 8' and floors 9 to form, in conjunction with the outwardly-flaring wall 53 of the base, airchambers 10; walls 54 of base 2 have a similar curvature to walls 53, their outer portions forming the pair of enlarged, lower troughs or inclined ways 11. Any convenient frame 12 may be employed, upon which floors 9 may be seated for the support of the receptacle and other parts of the apparatus.

I provide the housing jacket 13, having a lower holding-flange 14 at its open bottom adapted to pass inclosingly upon the upper part of wall 8' of the supporting-base and having convergent side walls 15, and preferably having a convexedly curved dome 16 for supporting the weight of the milk container 17.

Any convenient two-way valve 18 may be employed for container 17, the object being to control the flow of the milk so that it will pass coincidently and in equal quantities upon the inclined ways of the two sides of receptacle 1; the valve herein shown comprising the spindle 19 having the bearing head 20 provided with oppositely-disposed recesses 21, these recesses adapted to register with exit-ports 22 formed in the bearing plate 23, the latter being a part of the bottom of container 17. Ports 22 communicate with sleeves 24 secured upon the bottom of the container. The milk receptacle or container is supported upon arms 25 of housing jacket 13, and may be conveniently removed for scalding or cleaning, sleeves 24, at this time, passing aperture 26 of jacket 13, with sleeves 24 straddling the apex 4 of the water receptacle. Head 20, by means of spring 27, has a pressure upon the surface of plate 23, and by moving crank 28, the spindle and bearing head may be rotated so that the recesses 21 thereof become in alinement with ports 22, pintle 29 seated in recess 30, at this time, holding the head in a pivotal mounting so that the alinement will be correct; and by employment of the index 46, adjacent the crank, an operator may have a complete control of the passage of milk from the container, and by reason of the index, the supply may be gaged for subjecting the milk, during pasteurization, to the required degree of heat.

Any suitable burner or coil 31 is employed and is extended lengthwise within the arched recess 6 for heating the water in receptacle 1, and in operation, milk passes from receptacle 17 through valve 18, being divided in quantity by this valve, as explained, so that an equal amount flows upon the upper inclined passage ways 5, of sides 3 near apex 4, exteriorly of the water receptacle 1. The flow of milk will continue upon the several inclined ways, and while passing thereon will become heated to any desired degree, finally reaching the transverse passage ways 32 which extend from troughs 11 at the front end of the water receptacle to communicate with exit-port or tube 33.

A trap 34 may be seated removably upon tube 33, having a containing body 35 with a spout 36 and plugs 37. A thermometer 38 is employed to traverse one of these plugs and having its bulb in the flowing milk, as the latter passes the spout, whereby the heat of the milk may be tested. The milk passes gateways 39, during its movements, and increases in volume since an eddy is formed at these points, from a change in direction, and to prevent an overflow, I provide enlarged portions or guards 40 at the upper end of each inclined way, adjacent gateways 39, formed by widening the containing wall at said ends. Receptacle 1 may be filled by use of pipe 41, and may be emptied by means of faucets 42.

It will be noted that, in operation, the side walls of the cover or housing jacket are disposed uniformly adjacent the inclined passage ways; this operates to form an oven 43 to confine the heat which radiates exteriorly of walls 3 of receptacle 1, and reflects the heat therefrom upon the milk passage ways.

It is important that the supply of water in receptacle 1 may be visibly ascertained, and therefore I provide the glass gage 44, having a length sufficient to extend vertically from near the base to approach the apex of the water receptacle, and disposed exteriorly of the housing jacket. In order that this housing jacket may be operatively seated or may be removed from the water receptacle, it is provided with the slot 45. This slot is open from flange 14 to a point near the dome of the housing jacket, and has a uniform width sufficient to permit seating therein of the hood 47. The purpose of the hood is to prevent escape of heat from within the housing jacket while the apparatus is in operation.

The wall of the hood is secured exteriorly upon and projects outwardly of the end of the water receptacle, and has a width greater, of course, than the thickness of gage 44 or its bearings. The hood is disposed vertically and has parallel side walls, and when the housing jacket is operatively seated, the wall of slot 44 is closely adjacent the wall of the hood. When the apparatus is in operation, vapor from the heated milk passes tube 48 at the top of jacket 13, and a limited quantity of air passes, from the atmosphere, within the space between hood 47 and the wall of slot 44, sufficient to create the required draft for ventilation of oven 43.

It will be noted that the rear end of the arched recess 6 and its bottom are open, which allows air to pass to burner 31. Since the front end of this recess is closed by the downwardly inclined troughs 32, a chimney or flue 49 is employed which communicates with the front end of recess 6 and extends upwardly, exteriorly of the water receptacle. This prevents accumulation of deoxygenized air in recess 6 and materially aids combustion. In operation, gasolene has been used as a fuel, and is preferred, but other fuels may be employed.

Since the devices in receptacle 17 for control of the milk supply or feed operate automatically, it is desirable that the amount of milk in this receptacle may be visibly and conveniently ascertained, and therefore I provide the sight-opening formed therein, shown at 50.

The construction, as described, is such that the parts may be conveniently dissembled for cleaning purposes. Receptacles 17 may be lifted from arms 25. Jacket 13 has openings 51 and 52 which may be traversed, respectively, by flue 49 and tube 41, and the housing jacket may be removed from the water receptacle so that the inclined passage ways upon the water receptacle may be cleaned.

During pasteurization of milk, and by reason of heat, an adhering film is formed upon the metal surface upon which the heated milk travels. This film is well known to be difficult of removal. Accessibility of the passage ways for cleansing purposes, in the present construction, will therefore be appreciated by those familiar with sterilization of milk. One of the functions of the enlarged, lower troughs 11 is here seen, in that it operates as a reservoir for containing the accumulated water, while the passage ways are being sprayed and cleaned. The other function of trough 11 is to convey milk while being heated, the same as inclined passage ways 5.

The function of longitudinal chambers 10 is to contain heated air, during operation of the apparatus, to prevent radiation of heat from the base of the water receptacle.

From the description, it will be noted that the movement of milk is upon separate passage ways; at no time do these ways unite until the discharge port 33 is reached; the milk passing from each of sleeves 24 is therefore subjected to the same, or uniform, treatment. Also it will be seen that the heat from burner 31 is directed to a single surface, this being the arched wall of recess 6, and is not divided, as shown in other constructions, the result being that there is practically no loss from excess radiation. The principal radiating surfaces of the water receptacle, herein shown, are its side walls where the milk is heated, and on this account, there is a corresponding economy of fuel.

While I have explained exactness of construction, I do not wish to be understood as limiting myself thereby. It is considered that many details may be omitted or changed without departing from the scope of the invention, since the latter is determined by the claims.

What I claim as new and desire to secure by Letters Patent is,—

1. A pasteurizing and sterilizing apparatus, comprising a water receptacle having side walls extended upwardly-convergent from its base to form exterior, longitudinally inclined passage ways; a housing jacket adapted to have a seating inclosingly upon the water receptacle; means for passing a liquid upon said ways, and means for heating the water receptacle.

2. A pasteurizing and sterilizing apparatus, comprising a water receptacle having side walls extended upwardly-convergent from its base to form exterior, longitudinally inclined passage ways; a housing jacket having side walls formed upwardly-convergent; said housing jacket adapted to have a seating inclosingly upon with its side walls disposed uniformly adjacent the upwardly-convergent side walls of the water receptacle; means for passing a liquid upon said ways, and means for heating the water receptacle.

3. An apparatus as described, comprising a heating receptacle having side walls extended upwardly-convergent from its base to form a series of exterior, longitudinally inclined troughs, said troughs having reduced portions at one of their ends to form gate ways and having enlarged portions at their opposite ends to form guards; a housing jacket having side walls formed upwardly-convergent, said housing jacket adapted to have a seating inclosingly upon, with its upwardly-convergent side walls disposed uniformly adjacent the upwardly-convergent side walls of the heating receptacle; means for passing a liquid upon the series of inclined troughs, and means for imparting heat to the heating receptacle.

4. In an apparatus of the class described, the combination of a container, a water receptacle having a rectangular base with a longitudinal recess formed therein, and having side walls formed upwardly-convergent from its base with exterior, longitudinally inclined passage ways: a two-way valve having a connection with the container and in communication with said longitudinally inclined passage ways; means within said longitudinal recess for heating the water receptacle.

5. In an apparatus of the class described, the combination of a container, a water receptacle having a rectangular base with an arched, central, longitudinal recess formed to open upon its lower surface, and having side walls formed upwardly-convergent from said base with exterior, longitudinally inclined passage ways, a two-way valve having a connection with the container and in communication with said longitudinally inclined passage ways of the upwardly-convergent side walls of the water receptacle; means within said arched, central, longitudinal recess for heating the water receptacle.

6. In an apparatus of the class described, the combination of a container, a water receptacle having a rectangular base with an arched, central, longitudinal recess formed to open upon its lower surface, and having side walls formed upwardly-convergent from said base to form exterior, longitudinally inclined passage ways; a housing jacket having side walls formed upwardly-convergent; said housing jacket adapted to have a seating inclosingly upon said water receptacle with its upwardly-convergent side walls disposed uniformly adjacent the side walls thereof; a two-way valve having a connection with the container and in communication with said longitudinally inclined passage ways of the upwardly-convergent side walls of the water receptacle; means within said arched, central, longitudinal recess for heating the water receptacle.

7. In an apparatus of the class described, the combination of a container, a water receptacle having a rectangular base and having upwardly extending side walls inclined toward each other and having a vertically disposed water gage upon one of its ends, a hood secured upon and extended outwardly of the water receptacle to encompass said gage; a series of longitudinally inclined passage ways formed upon and exteriorly of the upwardly extending, inclined side walls of the water receptacle; a housing jacket having upwardly convergent side walls, and having a slot formed in one of its ends; a two-way valve having a connection with the container and in communication with the longitudinally inclined passage ways of the water receptacle; said housing jacket adapted to have a seating inclosingly upon the water receptacle with its side walls disposed adjacent the upwardly extending, inclined side walls of said water receptacle, the wall of said slot passing adjacent the wall of said hood; means for heating said water receptacle.

8. In an apparatus of the class described, the combination with a water receptacle having a rectangular base with air chambers formed to extend longitudinally therein and having an arched, longitudinal recess disposed intermediate said air chambers to open upon its bottom and provided with upwardly-extending, convergent side walls with longitudinally inclined passage ways formed thereon, of a housing jacket adapted to have a seating upon said rectangular base to inclose the upwardly-extending, convergent side walls of said water receptacle; a container; a two-way valve having a connection with the container and in communication with the longitudinally inclined passage ways of the upwardly-extending, convergent side walls of the water receptacle; means within said arched, longitudinal recess for heating said water receptacle.

In testimony whereof I have affixed my signature in presence of two witnesses.

CHARLES E. HINMAN.

Witnesses:

HIRAM A. STURGES,
H. C. COMPTON.